// United States Patent [15] 3,652,285
Delzenne et al. [45] Mar. 28, 1972

[54] PHOTOCHROMIC-PHOTOPOLYMERIZATION COMPOSITIONS

[72] Inventors: Gerard Albert Delzenne, 's-Gravenwezel; Georges Joseph Smets, Heverlee; Jan Antonius Hoefnagels, Berchem, all of Belgium

[73] Assignee: Gevaert-AGFA N.V., Mortsel, Belgium

[22] Filed: June 23, 1969

[21] Appl. No.: 835,727

[30] Foreign Application Priority Data

July 1, 1968 Great Britain ....................31,308/68

[52] U.S. Cl. ....................96/90 PC, 96/115 P, 96/115, 260/326.11

[51] Int. Cl. ....................G03c 1/72, G03c 1/68, C07d 27/36

[58] Field of Search ....................96/90 PC, 90, 115, 115 P; 252/300; 260/240, 326.1

[56] References Cited

UNITED STATES PATENTS 3,471,290 10/1969 Amidon et al. ....................96/90 PC 3,505,352 4/1970 Gautron ....................96/90 PC

FOREIGN PATENTS OR APPLICATIONS 1,089,095 11/1967 Great Britain ....................96/115 P

*Primary Examiner*—Norman G. Torchin
*Assistant Examiner*—Richard E. Fichter
*Attorney*—Alfred W. Breiner

[57] ABSTRACT

A photographic material and a process for the formation of non-fading images upon exposure to actinic light comprising a light-sensitive layer formed of a photochromic compound and a photo-hardening polymeric system is described. The photochromic compound has the formula:

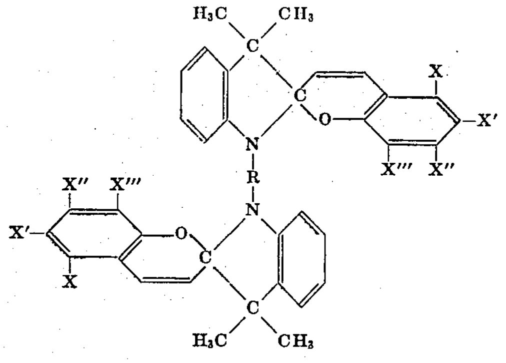

wherein:

R represents $-CH_2-CH=CH-CH_2-$, $-(CH_2)_n-$$-(CH_2)_n-$, $-(CH_2)_n-O-(CH_2)_n-$, $-(CH_2)_n-$, with $n$ being an integer from 1 to 8, X and X″ each represents hydrogen, chlorine, bromine, nitrile, acetyl, carboxy, hydroxy, nitro or methoxy, X′ represents hydrogen, chlorine, bromine, nitrile, acetyl, carboxy or nitro, and X‴ represents hydrogen, chlorine, bromine or nitro.

12 Claims, No Drawings

PHOTOCHROMIC-PHOTOPOLYMERIZATION COMPOSITIONS

This invention relates to a photographic material capable of forming a non-fading image in a layer of photographic material on exposure to actinic light.

In the published Dutch Patent application 6803558 a light-sensitive photographic material is described, which is capable of forming non-fading images on exposure to actinic light and which comprises a light-sensitive layer or stratum containing a photochromic material and a photo-hardening polymeric system. The photochromic materials that can be used are described by Richard Exelby in *Chem.Rev.*, 65, 247–260 (1965). Among these the spiro compounds especially the spiropyrans constitute a preferential class.

A class of new spiropyrans has been found, more particularly of dispiropyrans, which can be used very conveniently as photochromic material capable of forming non-fading photographic images.

According to the invention a light-sensitive photographic material is provided, which is capable of forming non-fading images on exposure to actinic light, which material comprises a light-sensitive layer or stratum containing a photochromic compound and a photo-hardening polymeric system, said photochromic compound being substantially colorless and presenting a reversible coloration upon irradiation with actinic light, said photochromic compound corresponding to the general formula:

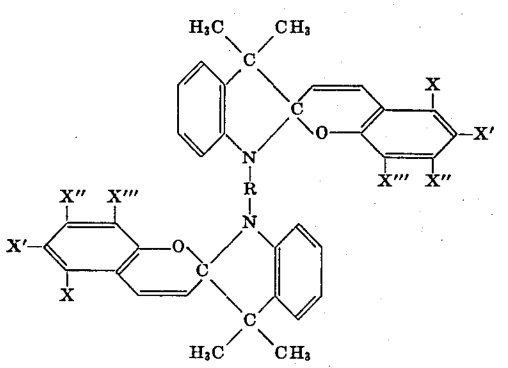

wherein:

R represents a —$(CH_2)_n$—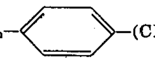—$(CH_2)_n$— group, a —$CH_2)_n$—O—$(CH_2)_n$— group, a —$(CH_2)_n$— group, or a —$CH_2$—CH=CH—$CH_2$— group,

*n* being an integer from 1 to 8,

X and X'' each represents a hydrogen, chlorine or bromine atom, a nitrile, acetyl, carboxy, hydroxy, nitro or methoxy group, X' represents a hydrogen, chlorine or bromine atom, a nitrile, acetyl, carboxy or nitro group, and X''' represents a hydrogen, chlorine or bromine atom, or a nitro group.

The photochromic dispiropyrans of the invention are new products prepared by condensation of substituted aromatic aldehydes with difunctional indoline bases; the two nitrogen atoms of the indoline fragment being linked through a common linking group.

In the same way as in the published Dutch Patent application 6803558 various classes of photo-hardening polymeric systems can be used, i.a. the polymers carrying cinnamate substituents, e.g., polyvinyl cinnamate, the polymers carrying coumarin and benzo(b)-thiophene groups, polymeric systems comprising reactive groups such as hydroxyl groups, thiol groups, aliphatic or aromatic double bonds, as well as a sufficient quantity of photo-cross-linking groups such as arylazido groups, azidocarbonyl groups, azidosulphonyl groups, quinone diazide groups and 1,2,3-thiadiazole groups. These photo-cross-linking groups are decomposed by actinic light rays and react with the reactive groups of the polymeric material to effect the cross-linking reaction. These photo-hardening polymeric systems have been described in the United Kingdom Patent specifications 1,062,884—1,074,234—1,082,195—1,087,416—1,089,095 and 1,115,427 and in the published Dutch Patent applications 6607506, 6610999, and 6702042.

The photochromic composition according to the present invention comprises reactive groups and photo-cross-linking groups in addition to photochromic groups. When this photochromic composition is dissolved in a solvent or in a mixture of solvents, the resulting solution can be coated on a support to form layers of the photochromic composition. Suitable supports are i.a. metal sheets, glass, cellulose ester films, poly-styrene films, polyester films, paper either or not coated with a covering layer, e.g., a baryta layer.

When exposing a layer comprising photochromic compounds uniformly to actinic light or when exposing it through a line original or a screen, the photochromic compound will change color at the exposed areas. Normally such color change would fade out, i.e., on exposure to light—usually of a longer wavelength—or during storage in the dark the color disappears.

However, this is not so when applying the system according the the present invention. Indeed, the color formed upon an exposure, which is sufficient to cross-link the polymer, is preserved to a large extent. If the exposure is performed through a line original or a screen, a non-fading image is formed thereof.

In the following preparation the manufacture of the dispiropyrans of the invention is exemplified.

Preparation of α, α'-bis{3',340 -dimethyl-6-nitrospiro [2H-1-benzopyran-2,240 -indolinyl-(1')]}-p-xylene A. 200 g. of p-xylene were heated to 130° C., and 392 g. of bromine were slowly added dropwise. After cooling to 50° C. 100 cc. of a mixture of equal volumes of acetone and hexane were added. Upon filtering α,α'-dibromo-paraxylene was obtained. Melting point: 149° C.

B. 272.5 g. of phenylhydrazine were boiled for 1 hour with 260 g. of methyl isopropyl ketone in 300 cc. of isopropanol. The methylisopropylphenylhydrazone formed was distilled (boiling point/4 mm. Hg= 128° C.). A mixture of 411 g. of the latter compound, 934 cc. of absolute isopropanol, and 1,457 g. of anhydrous zinc chloride was boiled for 8 hours under nitrogen. To this mixture 1.13 1 of water was added whereupon it was allowed to cool. A precipitate formed, which was decomposed with a 40 percent aqueous solution of potassium hydroxide. The oil set free was separated with ether. After drying on sodium sulphate, the ether was evaporated. The residue was distilled under reduced pressure to yield 2,3,3-trimethyl-indolenine. Boiling point/27 mm. Hg: 127° C.

C. 92.4 g. of α,α'-dibromoparaxylene (A) and 111.3 g. of 2,3,3-trimethylindolenine (B) together with 1.75 1 of methyl ethyl ketone were heated to 90° C. while stirring for 1 day. After cooling the precipitate was filtered and recrystallized from nitromethane to yield α,α'-bis[2,3,3-trimethyl-3H-indolium-yl-(1)]-p-xylene-dibromide. Melting point: 250°–255° C. (decomposition).

D. 0.01 mole of the latter product was dissolved in 100 cc. of water. After addition of 50 cc. of concentrated ammonia the solution was treated with ether and dried on sodium sulphate. The ether was evaporated. After cooling a white precipitate of α,α'-bis[2-methylene-3,3-dimethylindolinyl(1)]-p-xylene formed, which was filtered off. Melting point: 115° C.

E. 100 g. of salicylaldehyde were dissolved in 500 g. of glacial acetic acid. While stirring 150 g. of fuming nitric acid were added slowly in such a way that the temperature did not exceed 15° C. The temperature was then raised to 45° C, whereupon the mixture was poured at once in ice-water. While being heated the precipitate was dissolved in a solution of 25 g. of sodium hydroxide in 270 cc. of water. This new solution was allowed to stand half a day so that the sodium salts could crystallize. These sodium salts were dissolved in 1.5 l of hot water and filtered while warm. The sodium salt that crystallized upon cooling was filtered off and treated with 200 cc. of water. The 5-nitrosalicyl-aldehyde formed was recrystallized from ethanol. Melting point: 125° C.

F. 2.5 g. of 5-nitro-salicylaldehyde (E) and 3.15 g. of α,α'-bis[2-methylene-3,3-dimethylindolinyl-(1)]-p-xylene (D) were refluxed for 5 hours with 300 cc. of methyl ethyl ketone. The resulting solution was concentrated by evaporation. The residue was recrystallized from a mixture of equal volumes of toluene and acetone. Melting point: 161°–164° C.

The resulting product is α,α'{-bis 3',3',-dimethyl-6-nitrospiro[2H-1-benzopyran-2,2'-indolinyl(1)]}-p-xylene corresponding to the following structural formula:

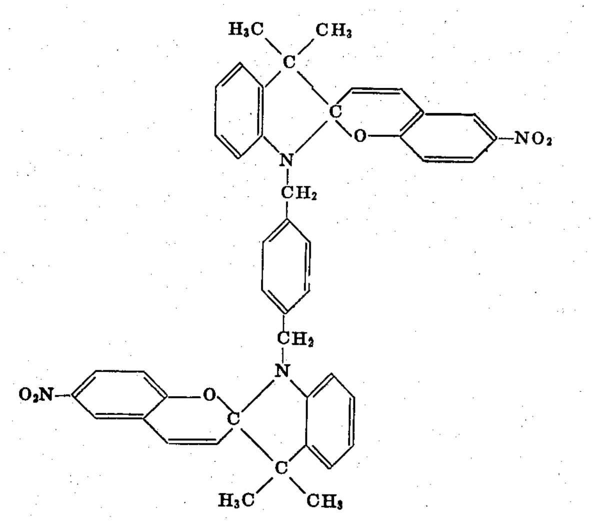

EXAMPLE 1

0.5 g. of polyester, prepared by polycondensation of 2,2-bis(4-hydroxyphenyl)-propane and 5-azido-isophthaloyl chloride as described in Example 1 of the Belgian Patent specification 656,511, was dissolved in 10 cc. of tetrachloroethane. Subsequently 0.05 g. of the photochromic compound (see preparation hereinbefore), which on exposure takes the merocyanine form instead of the spiro form as is commonly known, was also dissolved therein. The resulting solution was coated on a subbed polyethylene terephthalate film support in such a way that upon drying a layer with a thickness of 6 μ was obtained. A strip of the coated film (material A) was exposed for 5 minutes through a line original by means of a 80 watt high pressure mercury vapor lamp placed at a distance of 4.5 cm. At the exposed areas the color of the merocyanine form having an absorption maximum at 575 nm was clearly perceptible after 15 seconds. A clear reproduction of the line original was obtained. The exposure to light resulted in an increase of the optical density of the film at 575 nm, which increase could be measured spectrophotometrically (optical density: 0.96).

Another solution of the above photochromic compound was formed, but this time together with an unhardenable polymer viz polymethyl methacrylate. This solution was coated on a subbed polyethylene terephthalate film in order to obtain a comparison material B. This material in its turn was exposed to light of 575 nm and checked spectrophotometrically.

Then both materials were stored in the dark for 70 hours. The residual density of material A was found to be 0.35. The corresponding value for material B comprising polymethyl methacrylate amounted to only 0.075.

From these measurements it appeared that a light-sensitive material comprising a photo-hardening polymeric system in addition to the photochromic compound is capable of retaining a clear image after a long storage in the dark. However, in a light-sensitive material, wherein the photochromic compounds had been dispersed in a polymeric binder that cannot be cross-linked by the influence of light, the image faded very rapidly in the dark.

EXAMPLE 2

In a mixture of 5 cc. of methylene chloride and 5 cc. of tetrachloroethane were dissolved 0.025 g. of the dispiropyran prepared as described above and 0.25 g. of the reaction product of an epoxy resin with p-azido-benzene sulphonyl chloride as described in Example 2 of the published Dutch Patent application 6607506.

As in Example 1, the resulting solution was coated on a subbed polyethylene terephthalate film support in such a way that upon drying a layer having a thickness of approximately 6 μ was obtained. A strip of this coated film (material A) was exposed as in Example 1, whereupon the optical density was measured and found to be 1.29.

Just as in Example 1 a comparison material (B) was prepared with polymethyl methacrylate, and exposed.

Then both materials were stored in the dark for 70 hours. The residual density of material A was found to be 0.59. The corresponding value for material B comprising polymethyl methacrylate amounted to only 0.075.

EXAMPLE 3

The process of Example 2 was repeated. The photo-hardening polymer of Example 2, however, was replaced by a same quantity of the reaction product of a polyether with 2-diazo-1-oxo-1,2-dihydro-naphthalene-5-sulphonyl chloride as described in example 1 of the published Dutch Patent application 6702042. As solvent 10 cc. of tetrachloroethane were used. After an exposure of 5 minutes to ultraviolet radiation an optical density of 0.57 was measured. After storage of the material in the dark for 70 hours the optical density was still 0.32.

EXAMPLE 4

0.5 g. of polyester, prepared by polycondensation of 2,2-bis(4-hydroxyphenyl)-propane and 5-azido-isophthaloyl chloride as described in example 1 of the Belgian Patent specification 656,511, was dissolved in 10 cc. of tetrachloroethane. Subsequently 0.05 g. of the photochromic compound 1,5-bis{3',3'-dimethyl-6-nitrospiro[2H-1-benzopyran-2,2'-indolinyl(1)]}-pentane, which on exposure takes the merocyanine form instead of the spiro form, was also dissolved therein. The resulting solution was coated on a subbed polyethylene terephthalate film support in such a way that upon drying a layer with a thickness of 6 μ was obtained. A strip of the coated film (material A) was exposed for 5 minutes through a line original by means of a 80 watt high pressure mercury vapor lamp placed at a distance of 4.5 cm. At the exposed areas the color of the merocyanine form having an absorption maximum at 555 nm was clearly perceptible after 15 seconds. A clear reproduction of the line original was obtained. The exposure to light resulted in an increase of the optical density of the film at 555 nm, which increase was measured spectrophotometrically (optical density: 1.07). Another solution of the above photochromic compound was formed, but this time together with an unhardenable polymer viz polymethyl methacrylate. This solution was coated on a subbed polyethylene terephthalate film in order to obtain a comparison material B. This material in its turn was exposed to light of 555 nm and checked spectrophotometrically.

Then both materials were stored in the dark for 70 and 170 hours. In the first case the residual density values of materials A and B were 0.695 and 0.115 respectively. In the second case the values had decreased to 0.485 and 0.085 respectively.

From these measurements it appeared that a light-sensitive material comprising a photo-hardening polymeric system in addition to the photochromic compound is capable of retaining a clear image after a long storage in the dark. However, in a light-sensitive material, wherein the photochromic compounds had been dispersed in a polymeric binder that cannot be cross-linked by the influence of light, the image faded very rapidly in the dark.

EXAMPLE 5

The process of Example 4 was repeated. The photochromic compound, however, was replaced by a same quantity of α,α'-bis{3',3'-dimethyl-6-nitrospiro[2H-1-benzopyran-2,2'-indolinyl(1')]}-diethyl ether.

At the exposed areas of material A the color of the merocyanine form having an absorption maximum at 560 nm was clearly perceptible after 15 seconds. After an exposure of 5 minutes a clear reproduction of the line original was obtained. The exposure to light resulted in an increase of the optical density of the film at 560 nm, which increase could be measured spectrochemically (optical density: 1.10).

Another solution of the above photochromic compound, this time mixed with the unhardenable polymethyl methacrylate, was also coated on a subbed polyethylene terephthalate film, so as to make a comparison material B. This material in its turn was exposed to light of 560 nm and checked spectrophotometrically.

Then both materials were stored in the dark for 70 and 170 hours. In the first case the residual density values of materials A and B were 0.590 and 0.130 respectively. In the second case these values had decreased to 0.455 and 0.06 respectively.

EXAMPLE 6

The process of Example 4 was repeated. The photochromic compound, however, was replaced by a same amount of 1,4-bis{3'',3'-dimethyl-6-nitrospiro-[2H-1-benzopyran-2,2'-indolinyl(1')]}-butene-3.

At the exposed areas of material A the color of the merocyanine form having an absorption maximum at 560 nm was clearly perceptible after 15 seconds. After an exposure of 5 minutes a clear reproduction of the line original was obtained.

The exposure to light resulted in an increase of the optical density of the film at 560 nm, which increase could be measured spectrophotometrically (optical density: 0.94).

As in Example 4 a comparison material (B) comprising polymethyl methylmethacrylate as unhardenable polymer was made. This material in its turn was exposed to light of 560 nm and checked spectrophotometrically.

Then both materials were stored in the dark for 70 hours. The residual density of material A was found to be 0.49. The corresponding value of material B comprising polymethyl methacrylate amounted to only 0.075.

We claim:

1. In a process for forming non-fading images on exposure to actinic light of a light-sensitive photographic material comprising a light-sensitive layer containing a photochromic compound and a photo-hardening polymeric system, the improvement wherein the photochromic compound corresponds to the general formula:

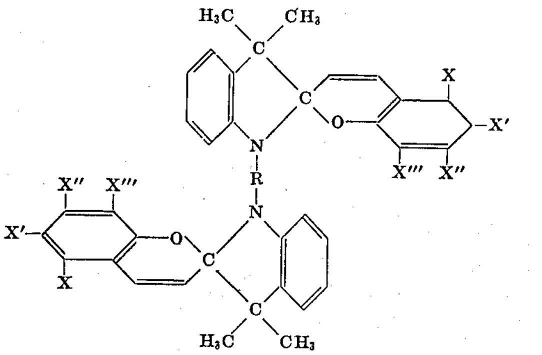

wherein:

R represents $-CH_2-CH{=}CH-CH_2-$, a $-(CH_2)_n-$$-(CH_2)_n-$ group, a $-(CH_2)_n-O-(CH_2)_n-$ group, or a $-(CH_2)_n-$ group, $n$ being an integer from 1 to 8, X and X'' each represents hydrogen, chlorine, bromine, nitrile, acetyl, carboxy, hydroxy, nitro, or methoxy, X' represents hydrogen, chlorine, bromine, nitrile, acetyl, carboxy, or nitro, and X''' represents hydrogen, chlorine, bromine, or nitro.

2. Process according to claim 1, wherein the photochromic compound corresponds to the formula:

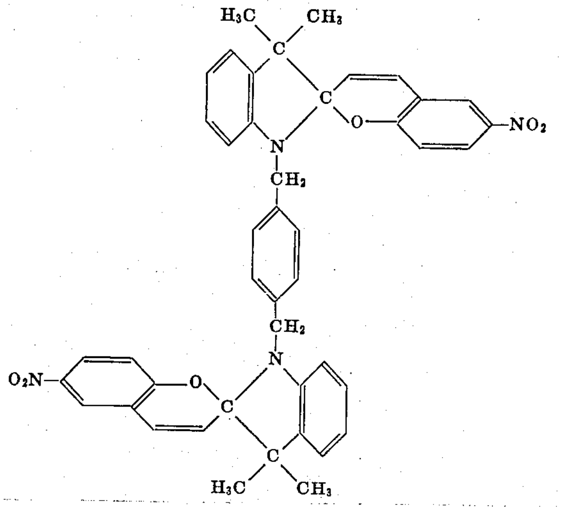

3. Process according to claim 1, wherein the photochromic compound corresponds to the formula:

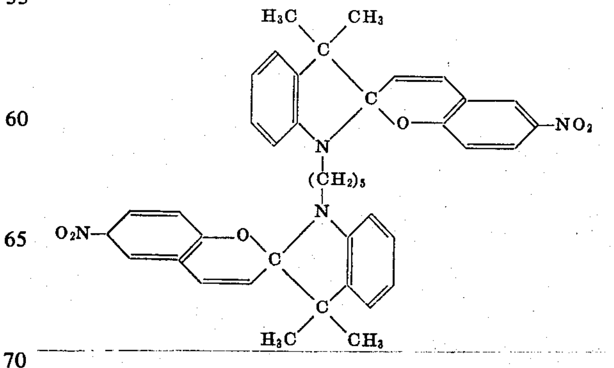

4. Process according to claim 1, wherein the photo-hardening polymeric system is a polyester prepared by polycondensation of 2,2-bis(4-hydroxyphenyl)-propane and 5-azido-isophthaloyl chloride.

5. Process according to claim 1, wherein the photo-hardening polymeric system is the reaction product of the polyether of 2,2-bis(4-hydroxyphenyl)-propane and epichlorohydrin with 5-azidobenzene sulphonyl chloride.

6. Process according to claim 1, wherein the photo-hardening polymeric system is the reaction product of the polyether of 2,2-bis(4-hydroxyphenyl)-propane and epichlorohydrin with naphthoquinone-1,2-diazide(2)-5-sulphochloride.

7. A light-sensitive photographic material which will form a non-fading image on exposure to actinic light comprising a photo-hardening polymeric system and a photochromic compound corresponding to the formula:

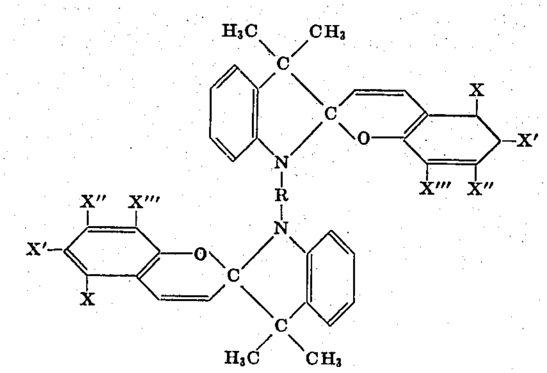

wherein:

R represents $-CH_2-CH=CH-CH_2-$, a $-(CH_2)_n-$ 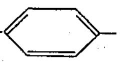 $-(CH_2)_n-$ group, a $-(CH_2)_n-O-(CH_2)_n-$ group, or a $-(CH_2)_n-$ group, $n$ being an integer from 1 to 8.

X and X'' each represents hydrogen, chlorine, bromine, nitrile, acetyl, carboxy, hydroxy, nitro, or methoxy, X' represents hydrogen, chlorine, bromine, nitrile, acetyl, carboxy, or nitro, and X''' represents hydrogen, chlorine, bromine, or nitro; said photochromic compound being present in an amount sufficient to form a non-fading image on exposure to actinic light.

8. Material according to claim 7, wherein the photochromic compound corresponds to the formula:

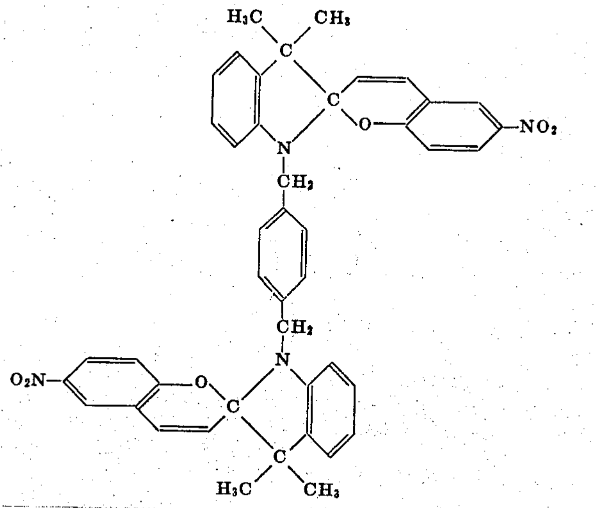

9. Material according to claim 7, wherein the photochromic compound corresponds to the formula:

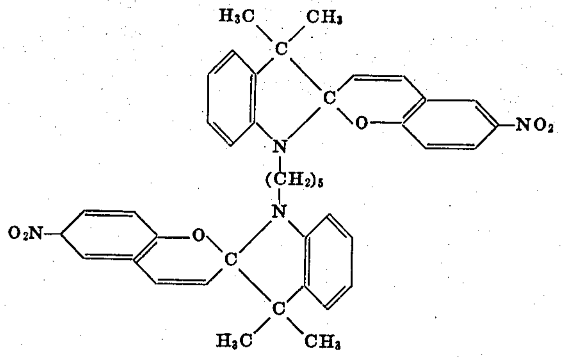

10. Material according to claim 7, wherein the photo-hardening polymeric system is a polyester prepared by polycondensation of 2,2-bis(4-hydroxyphenyl)-propane and 5-azido-isophthaloyl chloride.

11. Material according to claim 7, wherein the photo-hardening polymeric system is the reaction product of the polyether of 2,2-bis(4-hydroxyphenyl)-propane and epichlorohydrin with 5-azidobenzene sulphonyl chloride.

12. Material according to claim 7, wherein the photo-hardening polymeric system is the reaction product of the polyether of 2,2-bis(4-hydroxyphenyl)-propane and epichlorohydrin with naphthoquinone-1,2-diazide(2)-5-sulphochloride.

* * * * *